(12) United States Patent
Chalapathy

(10) Patent No.: US 11,438,457 B1
(45) Date of Patent: Sep. 6, 2022

(54) METHOD AND APPARATUS FOR COACHING CALL CENTER AGENTS

(71) Applicant: UNIPHORE SOFTWARE SYSTEMS INC. SYSTEMS I SOFTWARE SYSTEMS INC., Palo Alto, CA (US)

(72) Inventor: Ashwin Chalapathy, Bengaluru (IN)

(73) Assignee: UNIPHORE SOFTWARE SYSTEMS, INC., Palo Alto, CA (US)

( * ) Notice: Subject to any disclaimer, the term of this patent is extended or adjusted under 35 U.S.C. 154(b) by 0 days.

(21) Appl. No.: 17/213,156

(22) Filed: Mar. 25, 2021

(51) Int. Cl.
*H04M 3/51* (2006.01)
*G06N 20/00* (2019.01)
*H04M 3/42* (2006.01)

(52) U.S. Cl.
CPC .......... *H04M 3/5175* (2013.01); *G06N 20/00* (2019.01); *H04M 3/42221* (2013.01); *H04M 3/5191* (2013.01); *H04M 2203/401* (2013.01); *H04M 2203/403* (2013.01)

(58) Field of Classification Search
CPC .......... H04M 3/5175; H04M 3/42221; H04M 2203/403; H04M 2203/401; G06N 20/00
USPC .... 379/265.06, 265.05, 265.11, 242, 265.07, 379/265.03, 265.01
See application file for complete search history.

(56) References Cited

U.S. PATENT DOCUMENTS

2005/0175971 A1* 8/2005 Mcilwaine ........... G06Q 10/109
434/219
2006/0233346 A1* 10/2006 McIlwaine .......... H04M 3/5238
379/265.02

\* cited by examiner

*Primary Examiner* — Thjuan K Addy
(74) *Attorney, Agent, or Firm* — Praveer K Gupta

(57) ABSTRACT

A method and an apparatus for coaching call center agents is provided. The method includes analyzing a conversation of the agent with a first customer, determining a performance of the agent on at least one behavioral skill based on the analysis, generating automatically, a custom training package (CTP) based on the determined first performance, and sending the CTP for presentation on the agent device.

15 Claims, 3 Drawing Sheets

METHOD AND APPARATUS FOR COACHING CALL CENTER AGENTS

CROSS REFERENCE

This application claims priority to Indian Application No. 202111013186, filed on 25 Mar. 2021, which is incorporated herein by reference in its entirely.

FIELD

The present invention relates generally to improving call center computing and management systems, and particularly to providing guidance regarding a workflow to an agent during an active call, in a call center environment.

BACKGROUND

Several businesses need to provide support to its customers, which is provided by a customer care call center operated by or on behalf of the businesses. Customers place a call to the call center, where customer service agents address and resolve customer issues, to satisfy the customer's queries, requests, issues and the like. The agent uses a computerized call management system used for managing and processing calls between the agent and the customer. The agent attempts to understand the customer's issues, provide appropriate resolution, and achieve customer satisfaction. Customer satisfaction, in large part, is a function of training received by the agent, including behavioral training, such as voice and accent modulation, managing sentiments and emotion, and including competency training, such as knowing business specific workflows and actions.

However, call centers experience significant turnovers of agents, due to which new agents may not be adequately trained, and new agents typically have very less time to get trained and become productive. Further, rapid change in business circumstances lead to changes in business requirements, which requires additional or different training. Shifting trend to home-based workers also reduce or eliminates presence of the agents in the call center, reducing the opportunity for direct training. Due to these factors, traditional classroom-based trainings are rendered ineffective, and in particular in influencing behavioral changes.

Accordingly, there exists a need for improved techniques to coach call center agents.

SUMMARY

The present invention provides a method and an apparatus for coaching call center agents, substantially as shown in and/or described in connection with at least one of the figures, as set forth more completely in the claims. These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and an apparatus for coaching call center agents. Conversations between agents and customers are analyzed to assess performance (first performance) of the agents on desired skills, such as behavioral or competency skills, and any gaps in the performance with a desired state are identified. Based on the identified gaps, a custom training package (CTP) is generated automatically for the agent. The CTP may include training scripts, such as standard training scripts, business specific training scripts, and automatically generated customer simulation (AGCS) scripts, among other practice exercises and training content. The CTP may be consumed by the agent at any time, for example, from an agent device, remote to the call center, allowing the agent to have access to customized training on demand. The agent responds to the CTP and the practice exercise therein, and the agent's response to assessed to determine the agent's performance (second performance) based on the CTP, and the second performance is presented to the agent. The cycle of determining performance, generating custom training package based on the performance, improving performance by training using the custom training packages, and reassessing the performance after the training results in an automatically generated, ongoing and customized training program for the agent.

Figure 1:
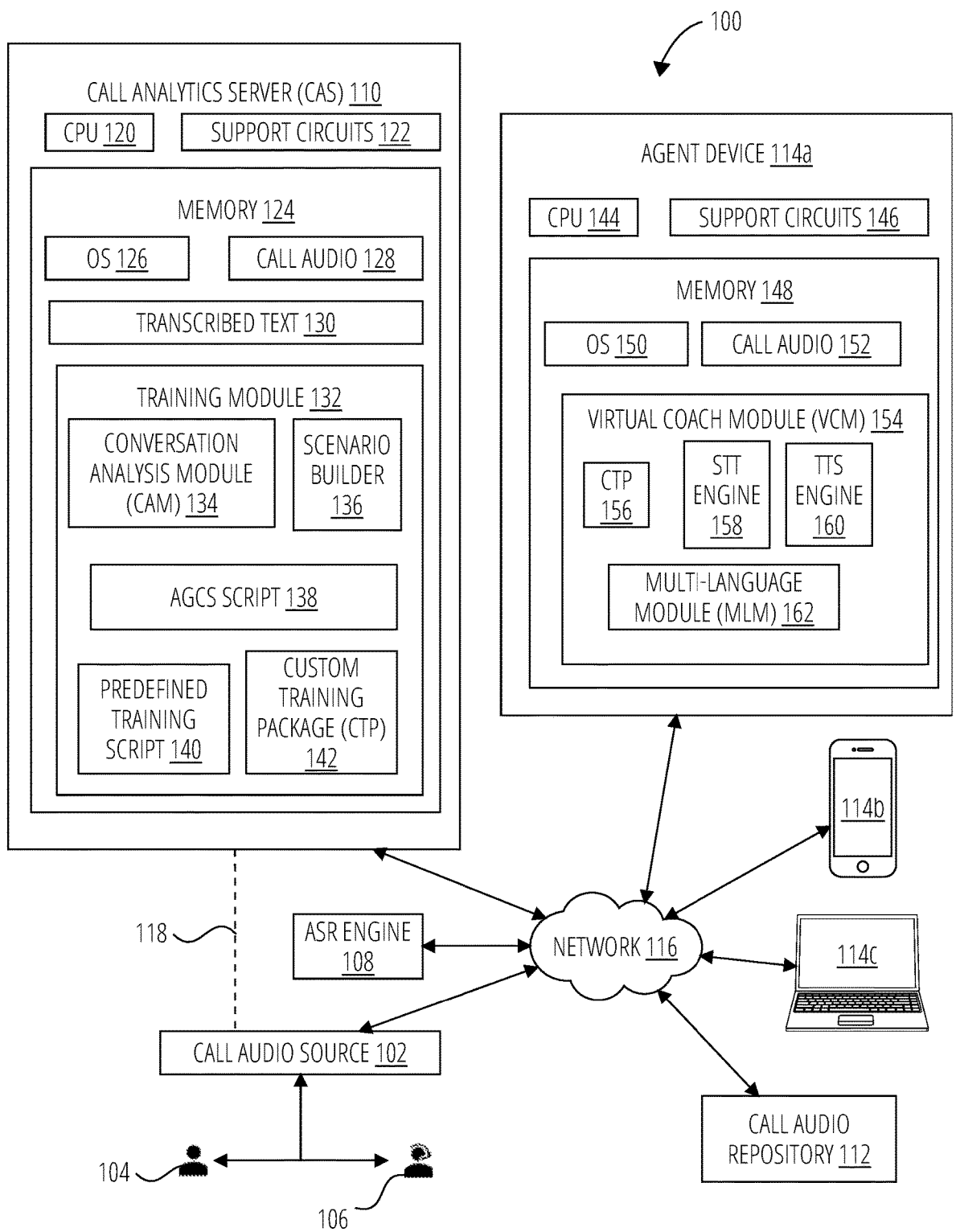
FIG. 1 illustrates an apparatus for coaching call center agents, in accordance with one embodiment.

FIG. 1 illustrates an apparatus 100 for coaching call center agents, in accordance with an embodiment of the present invention. The apparatus 100 comprises a call audio source 102, an automatic speech recognition (ASR) engine 108, a call analytics server (CAS) 110, a call audio repository 112, agent devices 114a, 114b, . . . 114c, each communicably coupled via a network 116. In some embodiments, the call audio source 102 is communicably coupled to the CAS 110 directly via a direct link 118, separate from the network 116, and may or may not be communicably coupled to the network 116.

The call audio source 102 provides audio of a call, for example, between a customer 104 and an agent 106, to the CAS 110. In some embodiments, the call audio source 102 is a call center providing live or recorded audio of an ongoing call between the call center agent 106 and the customer 104 of a business which the call center agent 106 serves.

The ASR engine 108 is any of the several commercially available or otherwise well-known ASR engines, as generally known in the art, providing ASR as a service from a cloud-based server. The ASR engine may be a proprietary ASR engine, or an ASR engine which can be developed using known techniques. ASR engines are capable of transcribing speech data (spoken words in an audio format) to corresponding text data (words or tokens in text format) using automatic speech recognition (ASR) techniques, as generally known in the art, and include a timestamp for some or each token(s). In some embodiments, the ASR engine 108 is implemented on the CAS 110 or is co-located with the CAS 110.

In some embodiments, the call audio repository 112 includes recorded audios of calls between a customer and an agent, for example, the customer 104 and the agent 106 received from the call audio source 102. In some embodiments, the call audio repository 112 includes previously recorded audios between an agent and one or more customers, such as the customer 104 and other customers, or audios between one or more agents and one or more customers. In some embodiments, the call audio repository 112 is located in the premises of the business associated with the call center.

The network 116 is a communication network, such as any of the several communication networks known in the art, and for example a packet data switching network such as the Internet, a proprietary network, a wireless GSM network, among others. The network 116 is capable of communicating data to and from the call audio source 102 (if connected), the ASR engine 108, the call audio repository 112, the CAS 110 and the agent devices 114a, 114b, . . . 114c.

The CAS 110 includes a CPU 120 communicatively coupled to support circuits 122 and a memory 124. The CPU 120 may be any commercially available processor, microprocessor, microcontroller, and the like. The support circuits 122 comprise well-known circuits that provide functionality to the CPU 120, such as, a user interface, clock circuits, Network communications, cache, power supplies, I/O circuits, and the like. The memory 124 is any form of digital storage used for storing data and executable software. Such memory includes, but is not limited to, random access memory, read only memory, disk storage, optical storage, and the like. The memory 124 includes computer-readable or computer-executable instructions corresponding to an operating system (OS) 126, a call audio 128, for example, one or more audios of a call between customers (for example, the customer 104, and other customers) and agents (for example, the agent 106, and other agents) received from the call audio source 102 or from the call audio repository 112, transcribed text 130 or transcript 130 corresponding to the call audio(s) 128, and a training module 132.

The transcribed text 130 is generated by the ASR engine 108 from the call audio 128. In some embodiments, the call audio 128 is transcribed in real-time, that is, as the conversation is taking place between the customer 104 and the agent 106. In some embodiments, the call audio 128 is transcribed turn-by-turn, according to the flow of the conversation between the agent 106 and the customer 104. The transcribed text 130 comprises words or tokens corresponding to the spoken words in the call audio 128, and a timestamp associated with some or all tokens.

The training module 132 obtains conversations of an agent on an ongoing basis, analyze the conversations and identify the agent's performance (first performance), including any deficiencies in the agent's performance. Based on the analysis, the training module 132 generates a custom training package (CTP), which is sent by the training module 132 to the agent device, for consumption by the agent. The agent may then consume the CTP on the agent device, for example, at home or any location outside work, or even at work, and may also respond to any practice exercises in the CTP. The response of the agent is received as an input on the agent device, and sent by the agent device to the training module 132, which grades the performance of the agent based on the response to the CTP (second performance), and sends the report of the performance to the agent device. The training module 132 assesses the first performance (performance of the agent based on the analysis of the agent's conversations) ongoingly, and updates the CTP based on first performance to the agent device. The training module 132 may also update the CTP based on the second performance (performance of the agent on the practice exercises in the CTP). In some embodiments, the training module 132 directs the ASR engine 108 to transcribe text for the agents' conversations, for example, from the call audio 128, and in some embodiments, the transcribed text of conversations of the agents is made available automatically at the CAS 110.

The training module 132 includes a conversation analysis module (CAM) 134, a scenario builder 136, a predefined training script 140, an AGCS script 138, and a custom training package (CTP) 142. The conversation analysis module (CAM) 134 is an artificial intelligence (AI) and/or Machine Learning (ML) module (AI/ML module), configured to analyze the transcribed text 130 and/or the call audio 128, and determine a first performance of an agent, for example, the agent 106. The CAM 134 analyzes the transcribed text 130 for several skills, including behavioral skills, such as sentiments expressed, rate of speech, persuasion, negotiation, objection handling, comprehension, narration, articulation, accent, among other behavioral skills that can be assessed based on the transcribed text 130, using techniques known in the art. In some embodiments, the CAM 134 also analyzes the call audio 128 for one or more skills, such as emotions expressed by the agent, determined by modulation of the speech signal, for example, using known techniques. Each of the behavioral skills has an associated objective metric, for example, sentiments expressed are measured using sentiment phrase detection model as known in the art, and assessed based on a high, medium and low number of positive, neutral and negative sentiment phrases. No negative sentiment phrases and neutral to positive sentiment phrases is considered a professional skill level; low negative sentiment phrases and neutral to positive sentiment phrases is considered intermediate skill level; and high negative sentiment phrases and low positive sentiment phrases is considered as a beginner level. Rate of speech is measured by words per minute, and a range of about 142 to about 160 words per minute is considered a professional skill level, between about 120 to about 180 words per minute is considered intermediate skill level, and outside this range is considered a beginner skill level. In some embodiments, the above and other metrics are measured on graduated scales that can be predefined, for example, according to a given customer or industry or other standards, as known in the art. Similar metric models can be generated for behavior skills, and some examples are shown in Table 1.

TABLE 1

| Behavioral Skills | Measuring Methodology | Beginner | Intermediate | Professional |
|---|---|---|---|---|
| Rate of speech | Words per minute analysis | Less than 120 or more than 180 words per min | 120-180 words per min | 140-160 words per minute |
| Accent | Categorization through accent based Automatic Speech Recognition models | Less than 40% confidence level of ASR | 40-80% confidence level of ASR | Greater than 80% confidence level of ASR |
| Expressing right sentiments on the call | Sentiment phrase detection model | High negative sentiment phrases + Low positive sentiment phrases | Low negative sentiment phrases + Low-mid positive sentiment phrases | No negative sentiment phrases + Mid-High positive sentiment phrases |
| Persuasion skills | Call conversion data analysis | Low call conversion rate | Medium call conversion rate | High call conversion rate |
| Narration skills | Voice modulation recognition model | Low frequency of voice modulation | High frequency of voice modulation | Appropriate frequency of voice modulation |
| Articulations skills | Dead air analysis + Fillerword analysis | High frequency of fillerwords + Frequent unintended pauses | Medium frequency of fillerwords + Frequent unintended pauses | Low frequency of filler words + Limited unintended pauses |

In some embodiments, the CAM 134 also assesses the transcribed text 130 for one or more competencies, such as the business process, workflows, terminology, promotions and offers, among others. The CAM 134 assesses competencies based on percentage of compliance as compared to standards defined in standard operating procedures (SOPs) defined by the business. Based on the analysis of the transcribed text 130, the CAM 134 determines the performance of the agent 106, also referred to as the first performance.

The CAM 134 analyzes the performance of the agent, and determines gap(s) in the current performance and a desired performance. For example, if the agent 106 is determined to be a beginner in rate of speech with an average of 210 words per minute, then it is determined that the gap for the agent 106 is reducing the rate of speech.

Based on the identified one or more gaps, the scenario builder 136 builds scenarios for the agent 106 to provide training. The scenario builder 136 may include a library of scenarios suitable for training for certain behavioral skills. For example, it is known that the rate of speech of agents increases when a customer speaks at a high rate of speech, brings up a tough issue, the customer is aggravated or excited, or that the agent tends to demonstrate negative sentiment when the customer consistently exhibits negative sentiment. The scenario builder 136 includes one or more of such scenarios in its library, along with other suitable scenarios for training other behavioral or competency skills. Scenarios include, without limitation, a scenario to train the agent to be calm when customers are rude, a scenario to train the agent to use alternate articulation techniques to explain a situation to the customer, a scenario to recognize flagging customer sentiment and counter the flagging customer sentiment by offering discounts, or a scenario to recognize positive customer sentiment and use the positive customer sentiment opportunity to cross sell or upsell, among several others.

In some embodiments, the scenario builder 136 is configured to present one scenario or a combination of more than one scenarios to generate an aggregate scenario, for example, to train an agent on multiple skills simultaneously, or on a single skill with the aggregate scenario. In some embodiments, the scenario builder 136 includes an autoregressive language model utilizing natural language processing (NLP) techniques, and in some embodiments, the scenario builder 136 includes a generative pre-trained transformer (GPT), for example, the GPT-3 created by OPEN AI LP and OPEN AI INC. of San Francisco, Calif. The scenario builder 136 is configured to generate, automatically, scripts simulating a customer according to determined scenario(s), referred to as automatically generated customer simulation (AGCS) scripts 138. The AGCS script 138 is usable for simulating a customer call and record agent responses to the simulations, to assess the agent's performance on the simulations.

The training module 132 also includes predefined training scripts 140, such as manually generated standard scripts for training behavioral skills, and manually generated tailored training scripts directed to the business, and includes default pitches, product feature narrations, persuasion scripts, or other manually generated business-specific scripts.

Based on the identified skill gap for an agent, the training module 132 combines the AGCS script 138, the predefined training script 140, and formulates a custom practice exercise(s) for the agent, to train or coach the agent in the identified skills, referred to as the custom training package (CTP) 142. The CTP 142 includes the predefined and AGCS scripts, practice exercise based thereon, the agent's performance history, and comparative performance with reference to other agents. The training module 132 sends the CTP 142 to the agent device 114a for being rendered on the agent device 114a, for example, for consumption by the agent 106.

The agent device 114a includes a CPU 144 communicatively coupled to support circuits 146 and a memory 148. The CPU 144 may be any commercially available processor, microprocessor, microcontroller, and the like. The support circuits 146 comprise well-known circuits that provide functionality to the CPU 144, such as, a user interface, clock circuits, Network communications, cache, power supplies, I/O circuits, and the like. The memory 148 is any form of digital storage used for storing data and executable software. Such memory includes, but is not limited to, random access memory, read only memory, disk storage, optical storage, and the like. The memory 148 includes computer-readable or computer-executable instructions corresponding to an operating system (OS) 150, a call audio 152, for example, audio of a call between a customer and an agent received from the call audio source 102, the call audio repository 112 or the CAS 110, and a virtual coach module (VCM) 154. The agent device 114a is user computing device, such as a personal computer, a tablet, a smartphone, and the like, which is typically used by an agent, for example, the agent 106 for learning purposes. The virtual coach module (VCM) 154 may be implemented as a custom application for the OS 150, such as a smartphone application or an app, or as a web application that runs on an Internet browser, for example, as known generally in the art. The agent 106 may use the agent device 114a at work, that is, in the call center, or outside of work, such as at home or other places. The CAS 110 serves multiple agent devices, for example, 114a, 114b, . . . 114c, each corresponding to different agents, however, all agent devices operate in a similar manner as the agent device 114a.

The VCM 154 includes a custom training package (CTP) 156, for example, received from the CAS 110, a speech-to-text (STT) engine 158, a text-to-speech (TTS) engine 160, and a multi-language module (MLM) 162. In some embodiments, the CTP 156 is the CTP 142 received from the CAS 110. The VCM 154 is configured to generate simulated customer audio using the TTS engine 160, scripts and designed exercise of the CTP 156. The agent 106 may access the exercise on the agent device 114a, for example, listen on the agent device 114a speakers, speech corresponding to the scripts in the CTP 156 generated using the TTS engine 160, and the agent 106 may respond using the user interface of the agent device 114a, for example, by speaking into a microphone of the agent device 114a. The VCM 154 transcribes the agent 106 response from speech form to text using the STT engine 158. The MLM 162 is configured to assist in translating the scripts or transcribed text to different languages, for example, to assist an agent with practice exercises, understanding of concepts in training material, among others.

A partial example of simulated training environment generated at the agent device 114a, capturing the agent's speech response and converting the speech to text is provided:

Agent: Hello!
Customer Simulation: Hello.
Agent: How may I help you?
Customer Simulation: I bought your product a week ago and it has stopped working. I am frustrated.
Agent: I am sorry to hear that
Customer Simulation: I am very disappointed with your company's product. This is useless.
Agent: . . .

The responses of the agent 106 to the simulated utterances of the customer are captured as responses, which may then be analyzed further, for example, as discussed herein.

In some embodiments, the VCM 154 sends the response to the CAS 110 for further analysis of the agent's performance after the consumption of the training/coaching using the CTP 156, on the practice exercise(s) of the CTP 156. The CAS 110 analyzes the response including the transcribed text of the agent's response in a manner similar to the analysis of the transcribed text 130, and determines the second performance of the agent 106, which refers to the performance of the agent 106 after the consumption of the training/coaching using the CTP 156, on the practice exercise(s) of the CTP 156 at the agent device 114a. The second performance determined at the CAS 110 is sent by the training module 132 to the agent device 114a, where the VCM 154 displays the second performance, for example, for the attention of the agent 106.

In some embodiments, the CAS 110, based on the second performance, updates the CTP 142 and send to the agent device 114a, or makes a new CTP 142 and send to the agent device 114a, for example, as discussed with respect to generation of the CTP 142. The VCM 154 of the agent device stores the updated or new CTP 142 received from the CAS 110 as the CTP 156, and presents the practice exercises according to the CTP 156, iterating the training cycle for the agent 106. In some embodiments, the CAS 110 additionally or alternatively updates the CTP 142 or remakes the CTP 142 based on the agent's 106 additional conversations with customers, for example, as received from the call audio source 102 or the call audio repository 112. In this manner, the CAS 110 iterates the process of generating the CTP 142 customized for training the agent 106 according to a current performance of the agent 106, sending the CTP 142 for consumption by the agent 106 on the agent device 114a, receiving the response by the agent 106, assess the agent's 106 performance to the CTP or the conversations with customers, and generate a new or updated CTP 142 for the agent 106 accordingly.

Figure 2:
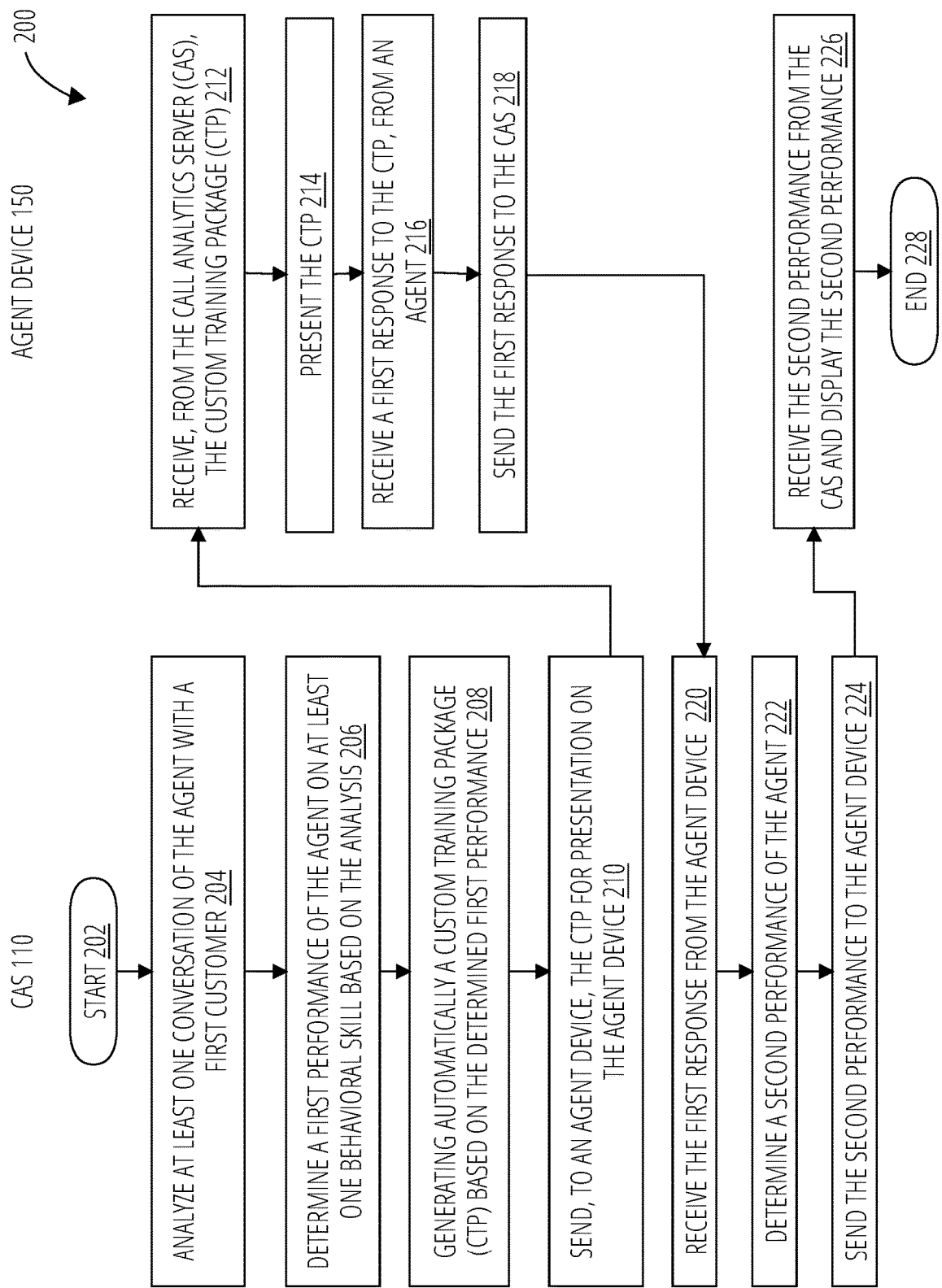
FIG. 2 illustrates a method for training an agent of a call center, for example, using the apparatus 100 of FIG. 1, in accordance with one embodiment.

FIG. 2 illustrates a method 200 for training an agent of a call center, for example, using the apparatus 100 of FIG. 1, in accordance with an embodiment. The method 200 begins at step 202, and proceeds to step 204, at which, the method 200 analyzes, on a call analytics server (CAS), at least one conversation of the agent with a first customer. At step 206, method 200 determines, on the CAS, a first performance of the agent on at least one behavioral skill based on the analysis of the conversation. At step 208, method 200 generates automatically, on the CAS, a custom training package (CTP) based on the determined first performance. For example, the automatically generated CTP includes predefined scripts and AGCS scripts, and practice exercises based thereon. At step 210, method 200 sends, from the CAS to an agent device, the CTP for presentation on the agent device.

At step 212, method 200 receives, on the agent device from a call analytics server (CAS), the custom training package (CTP), wherein the CTP is generated automatically on the CAS based on a first performance of the agent determined on the CAS, the first performance determined based on an analysis of at least one conversation of the agent with a first customer. At step 214, method 200 presents, on the agent device, the CTP, wherein the CTP comprises at least one of current agent performance, comparative agent performance, predefined training script, automatically generated customer simulation (AGCS) script, practice exercise, coaching tip, or a multimedia presentation, wherein the AGCS script simulates a customer in a simulation, the AGCS script is automatically generated on the CAS using artificial intelligence (AI) and/or machine learning (ML) (AI/ML) techniques. At step 216, method 200 receives, on the agent device, a first response to the CTP, the first response comprising at least one of an indication of consumption of the predefined training script, the AGCS script, the coaching tip, the multimedia presentation, or a response to the practice exercise. For example, the response on the agent device is received from an agent. At step 218, method 200 sends, from the agent device to the CAS, the first response.

At step 220, the CAS receives the first response from the agent device, and at step 222, the method 200 determines a second performance of the agent based on the first response. For example, the second performance is determined using the same methodology as for the first performance, however, instead of a transcribed text 130 of the agent's conversation with a customer, a transcription of the agent's response to training scripts (predefined training scripts, AGCS scripts) is used. The method 200 proceeds to step 224, at which the method 200 sends the second performance of the agent from the CAS to the agent device. At step 226, the method 200 receives the second performance of the agent from the CAS at the agent device, and displays the second performance on the agent device. The method 200 proceeds to step 228, at which the method 200 ends.

Several steps of the method 200 may be iterated after step 228, for example, steps 204-210 may be performed for a second customer or other conversation(s) of the same customer 104, or steps 220-224 may be performed for response of the agent received from the agent device 114a for additional practice exercise, or both. In this manner, the method 200 extends to form a continuous improvement training program, customized for the agent 106.

Figure 3:
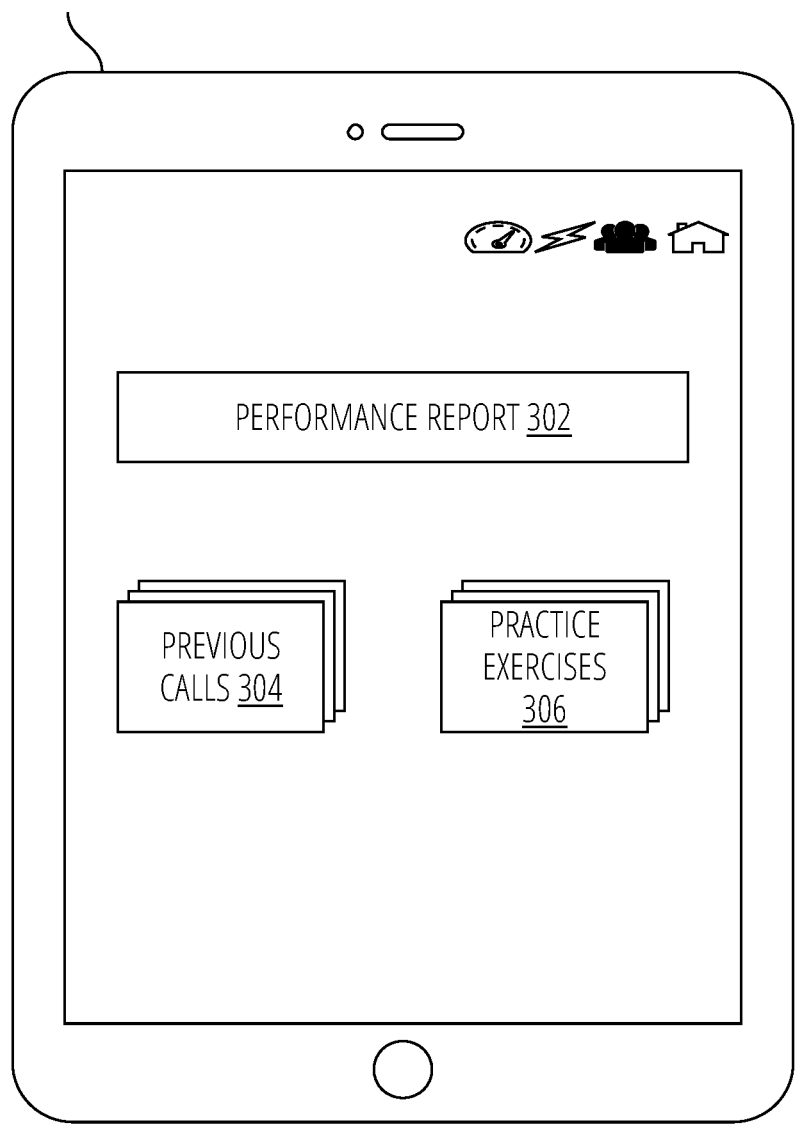
FIG. 3 illustrates an agent device, in accordance with one embodiment.

FIG. 3 illustrates the agent device 114a, displaying the CTP 156, in accordance with one embodiment. The CTP 156 comprises a performance report of the agent 106, displayed as the performance report 302, and practice exercises 306. In some embodiments, the CTP 156 also includes previous calls 304 of the agent 106 provided for review purposes. The previous calls 304 include previous calls of the agent 106 with one or more customers, or agent responses to practice exercises of the CTP 156.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

I claim:

1. A method for training an agent of a call center, the method comprising:
   analyzing, on a call analytics server (CAS), at least one conversation of the agent with a first customer;
   determining, on the CAS, a first performance of the agent on at least one behavioral skill based on the analyzing;
   generating automatically, on the CAS, a custom training package (CTP) based on the determining, wherein the CTP comprises an automatically generated customer simulation (AGCS) script and a practice exercise, wherein the AGCS simulates a customer in a simulation, and is automatically generated on the CAS; and
   sending, from the CAS to an agent device, the CTP for presentation on the agent device.

2. The method of claim 1, wherein the CTP further comprises at least one of current agent performance, comparative agent performance, predefined training script, coaching tip, or a multimedia presentation, wherein the AGCS script is generated using artificial intelligence and/or machine learning (AI/ML) techniques.

3. The method of claim 2, further comprising:
   receiving, at the CAS from the agent device, a first response to the custom training package;
   determining, at the CAS, a second performance of the agent based on the first response; and
   sending, from the CAS to the agent device, the second performance.

4. The method of claim 3, wherein the at least one conversation comprises a plurality of conversations of the agent with a plurality of customers comprising the first customer.

5. The method of claim 2, wherein the analyzing is based on AI/ML techniques.

6. A method for training an agent of a call center, the method comprising:
   receiving, on an agent device from a call analytics server (CAS), a custom training package (CTP), wherein the CTP is generated automatically on the CAS based on a first performance of the agent determined on the CAS, the first performance determined based on an analysis of at least one conversation of the agent with a first customer;
   presenting, on the agent device, the CTP, wherein the CTP comprises an automatically generated customer simulation (AGCS) script and a practice exercise, wherein the AGCS simulates a customer in a simulation, and is automatically generated on the CAS using artificial intelligence (AI) and/or machine learning (ML) (AI/ML) techniques;
   receiving, on the agent device, a first response to the CTP, the first response comprising at least one of an indication of consumption of the AGCS script, or a response to the practice exercise; and
   sending, from the agent device to the CAS, the first response.

7. The method of claim 6, further comprising receiving, on an agent device from the CAS, a second performance of the agent, the second performance determined on the CAS based on the first response.

8. The method of claim 7, wherein the at least one conversation comprises a plurality of conversations of the agent with a plurality of customers comprising the first customer.

9. An apparatus for training an agent of a call center, the apparatus comprising:
   a processor; and
   a memory comprising computer-executable instructions that when executed by the processor, configure the apparatus to:
      analyze, on a call analytics server (CAS), at least one conversation of the agent with a first customer;
      determine, on the CAS, a first performance of the agent on at least one behavioral skill based on the analysis;
      generate automatically, on the CAS, a custom training package (CTP) based on the determined first performance, wherein the CTP comprises an automatically generated customer simulation (AGCS) script and a practice exercise, wherein the AGCS simulates a customer in a simulation, and is automatically generated on the CAS; and
      send, from the CAS to an agent device, the CTP for presentation on the agent device.

10. The apparatus of claim 9, wherein the CTP further comprises at least one of current agent performance, comparative agent performance, predefined training script, coaching tip, or a multimedia presentation,
  wherein the AGCS script is generated use artificial intelligence machine learning (ML) techniques.

11. The apparatus of claim 10, wherein the instructions further configure the apparatus to:
  receive, at the CAS from the agent device, a first response to the custom training package;
  evaluate, at the CAS, the response;
  determine, at the CAS, a second performance of the agent; and
  send, from the CAS to the agent device, the second performance.

12. The apparatus of claim 11, wherein the at least one conversation comprises a plurality of conversations of the agent with a plurality of customers comprising the first customer.

13. A non-transitory computer-readable storage medium for training an agent of a call center, the computer-readable storage medium including computer-executable instructions that, when executed by a computer, cause the computer to:
  receive, on an agent device from a call analytics server (CAS), a custom training package (CTP), wherein the CTP is generated automatically on the CAS based on a first performance of the agent determined on the CAS, the first performance determined based on an analysis of at least one conversation of the agent with a first customer;
  present, on the agent device, the CTP, wherein the CTP comprises an automatically generated customer simulation (AGCS) script and a practice exercise, wherein the AGCS simulates a customer in a simulation, and is automatically generated on the CAS using artificial intelligence (AI) and/or machine learning (ML) (AI/ML) techniques;
  receive, on the agent device, a first response to the CTP, the first response comprising at least one of an indication of consumption of the AGCS script, or a response to the practice exercise; and
  send, from the agent device to the CAS, the first response.

14. The non-transitory computer-readable storage medium of claim 13, wherein the instructions further configure the computer to receive, on an agent device from the CAS, a second performance of the agent, the second performance determined on the CAS based on the first response.

15. The non-transitory computer-readable storage medium of claim 14, wherein the at least one conversation comprises a plurality of conversations of the agent with a plurality of customers comprising the first customer.

* * * * *